United States Patent
Rothschild

(10) Patent No.: US 11,443,539 B2
(45) Date of Patent: Sep. 13, 2022

(54) SYSTEM AND METHOD FOR IDENTIFYING AND TAGGING INDIVIDUALS PRESENT IN AN IMAGE

(71) Applicant: Leigh M. Rothschild, Miami, FL (US)

(72) Inventor: Leigh M. Rothschild, Miami, FL (US)

(*) Notice: Subject to any disclaimer, the term of this patent is extended or adjusted under 35 U.S.C. 154(b) by 0 days.

(21) Appl. No.: 16/780,290

(22) Filed: Feb. 3, 2020

(65) Prior Publication Data
US 2022/0139100 A1    May 5, 2022

(51) Int. Cl.
*G06V 40/10*  (2022.01)
*G06V 10/74*  (2022.01)
*H04W 76/14*  (2018.01)
*G06V 40/50*  (2022.01)

(52) U.S. Cl.
CPC .............. *G06V 40/10* (2022.01); *G06V 10/74* (2022.01); *G06V 40/50* (2022.01); *H04W 76/14* (2018.02); *G06V 2201/10* (2022.01)

(58) Field of Classification Search
CPC ....... G06F 16/58; G06T 1/0007; G06V 10/44; G06V 20/30; G06V 40/172; G06V 40/173; H04W 4/80; Y02D 30/70
See application file for complete search history.

(56) References Cited

U.S. PATENT DOCUMENTS

| | | | | |
|---|---|---|---|---|
| 8,204,437 B1* | 6/2012 | Rothschild | ......... | H04N 1/00127 455/446 |
| 9,330,468 B2* | 5/2016 | Shaw | ...................... | G06V 40/20 |
| 9,875,395 B2* | 1/2018 | Myers | .................. | G06V 40/168 |
| 10,003,730 B2* | 6/2018 | Earnshaw | .......... | H04N 5/23206 |
| 2007/0098303 A1* | 5/2007 | Gallagher | .............. | G06V 40/16 707/E17.02 |
| 2014/0064576 A1* | 3/2014 | Gong | .................... | G06V 10/255 382/118 |
| 2015/0339517 A1* | 11/2015 | Liu | ....................... | G06V 40/172 382/115 |
| 2016/0050171 A1* | 2/2016 | Salvador | ............. | G06F 16/5854 709/206 |
| 2017/0357876 A1* | 12/2017 | Rothschild | ............ | G06F 16/583 |
| 2018/0285387 A1* | 10/2018 | Rothschild | .............. | G06F 16/58 |
| 2019/0313009 A1* | 10/2019 | Alameh | ............. | H04N 5/23296 |

* cited by examiner

*Primary Examiner* — David Bilodeau
(74) *Attorney, Agent, or Firm* — Sugouri Saprina Batra

(57) ABSTRACT

A system and a method for identifying and tagging individuals present in an image are disclosed. The method comprises detecting a second device present in proximity of a first device, for establishing a connection. The connection may be established while the first device enters in a camera mode. Immediately after the first device captured an image, the first device may receive identity information of individuals from the second device. The identity information of individuals may comprise at least one of images and personal details of the individuals. Based on the received identity information, the first device may identify the individuals present in the image. The identified individuals present in the image may be tagged using their corresponding identities. Such tagging information may be stored in metadata of the image for a later usage.

20 Claims, 3 Drawing Sheets

SYSTEM AND METHOD FOR IDENTIFYING AND TAGGING INDIVIDUALS PRESENT IN AN IMAGE

FIELD OF THE DISCLOSURE

The present disclosure is generally related to image processing, and more particularly related to identification of individuals present in an image.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The process of identifying an individual present in an image is known since a long time. Such process requires image comparison using known techniques. The process of identifying an individual begins with detecting an individual present in the image. Successively, the individual is identified using object identification techniques and algorithms. Features of the individual such as facial features are then matched with reference images stored in a database. Upon finding a successful match, details of the identified individual are retrieved from the database and are used further.

The limitation associated with such method of identifying an individual comprises utilization of large memory space and high computation capability. A large memory space is utilized for storing a large number of the reference images. Further, the high computation capability is required for processing of the large number of reference images. Thus, such method could only be performed on a computer or a server having a large memory and high processing capability.

There is no mechanism to identify individuals, present in an image, using a mobile device such as a smart phone. Thus, there remains a need to identify and tag the images using a mobile device, where individuals present in an image captured by the mobile device itself could be used.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
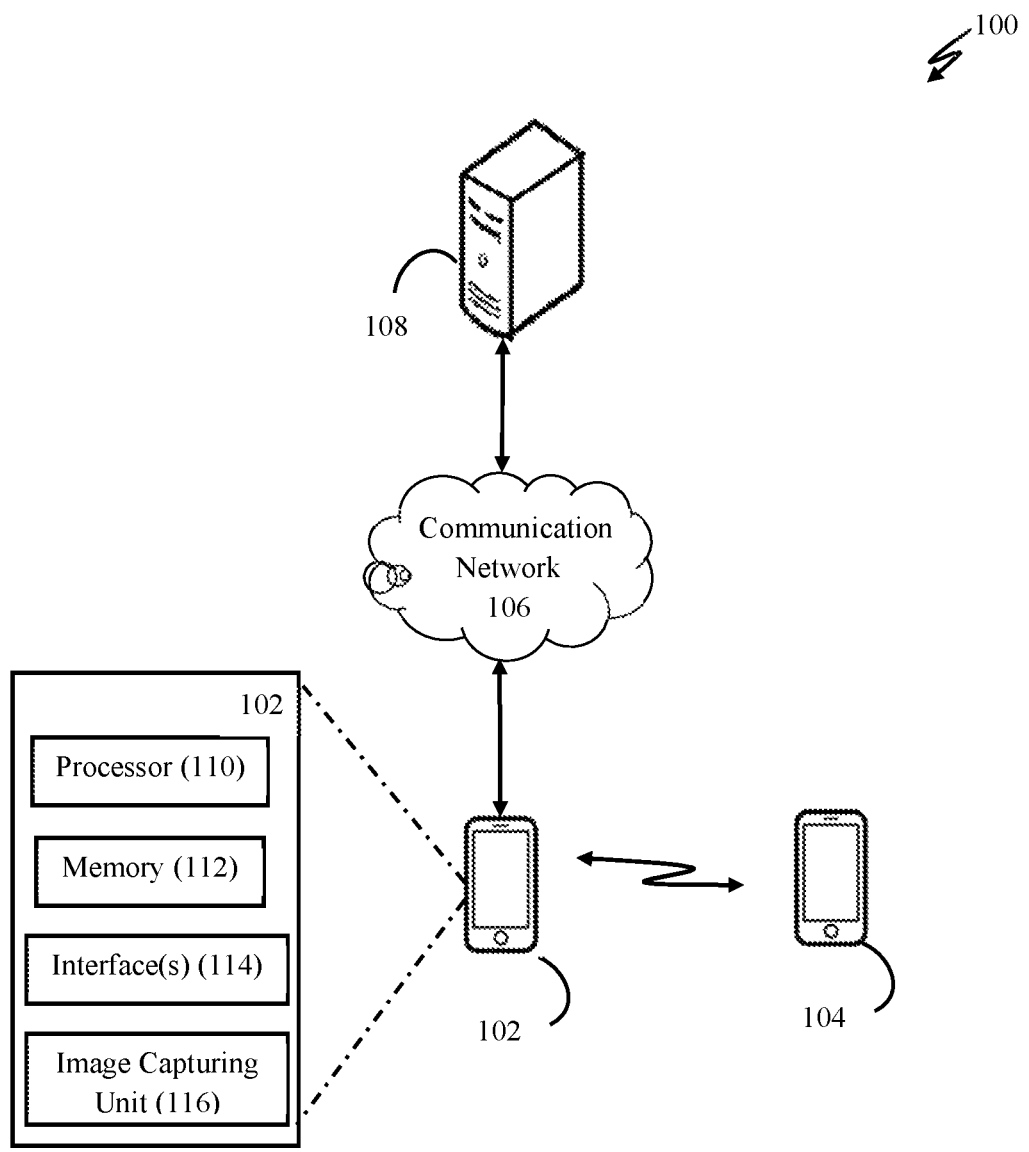
FIG. 1 illustrates a network connection diagram of a system 100 for identifying and tagging individuals present in an image, according to an embodiment.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

A system 100 may comprise a first device 102 and a second device 104. The first device 102 may be one of a camera, handy-cam, smart phone, tablet, phablet, and laptop. In one exemplary embodiment, the first device 102 is illustrated as a smart phone. The system 100 also illustrates a communication network 106 for allowing data exchange between the first device 102 and a remote server 108. The first device 102 may comprise a processor 110, memory 112, interface(s) 114, and an Image capturing Unit 116.

The processor 110 may execute an algorithm stored in the memory 112 for identifying and tagging individuals present in a captured image. The processor 110 may also be configured to decode and execute any instructions received from one or more other electronic devices or server(s). The processor 110 may include one or more general purpose processors (e.g., INTEL or Advanced Micro Devices (AMD) microprocessors) and/or one or more special purpose processors (e.g., digital signal processors or Xilinx System On Chip (SOC) Field Programmable Gate Array (FPGA) processor). The processor 110 may be configured to execute one or more computer-readable program instructions, such as program instructions to carry out any of the functions described in this description.

The memory 112 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The interface(s) 114 may be used by a user to operate the first device 102. The interface(s) 114 may be used either to accept an input from the user or to provide an output to the user, or performing both the actions. The interface(s) 114 may either be a Command Line Interface (CLI), Graphical User Interface (GUI), or a voice interface.

FIG. 1 illustrates a network connection diagram of the system 100 for identifying and tagging individuals present in an image, according to an embodiment. FIG. 1 illustrates a smart phone being used as the first device 102. The user may operate the first device 102 using the interface(s) 114.

In one embodiment, the user may detect devices present in proximity of the first device. The first device 102 may scan the devices present in proximity using known scanning techniques such as Wireless Fidelity (Wi-Fi), Bluetooth, Near Field Communication (NFC), Infrared (IR), and Radio Frequency Identification (RFID). In one case, the first device 102 may find a second device 104 upon scanning.

Successive to discovering the second device 104, the first device 102 may establish a connection with the second device 104. The first device 102 may establish such connection by sending a connection request to the second device 104. Alternatively, the connection request may be sent by the second device 104 to the first device 102. The connection request may be sent using a wired or wireless communication technique. The wireless communication technique used for sending the communication request may be selected from a group consisting of Wireless Fidelity (Wi-Fi), Bluetooth, Cellular, Near Field Communication (NFC), Infrared (IR), and Radio Frequency Identification (RFID).

In one embodiment, the connection request may be sent while the first device 102 enters into a camera mode for capturing images. The connection request may be sent immediately before capturing an image or immediately after capturing the image. The first device 102 may capture said images using an image capturing unit 116. The image capturing unit 116 may be embedded into a circuitry of the first device 102 or may be externally connected to the first device 102. The image capturing unit 116 may be any of a Charge Coupled Device (CCD) and Complementary Metal Oxide Semiconductor (CMOS) sensor.

In one case, successive to capturing an image, the first device 102 may receive identity information of individuals from the second device 104. The identity information may be received irrespective of the presence of the owner of the second device 104 in the captured image. The identity information may belong to an owner of the second device 104 and family, friends, and relatives of the owner of the second device 104. The identity information may comprise images and personal details of the individuals. The personal details of the individuals may comprise a name, address, phone number, websites, an e-mail identity, and social media links of the owner of the second device 104.

In one embodiment, the identity information may be encrypted to prevent risk of data loss. The encryption may be performed using encryption techniques such as Rivest Shamir Adleman (RSA), Triple Data Encryption Standard (DES), Blowfish, Twofish, Advanced Encryption Standard (AES) and the like. The encryption may be performed using a 32-bit or 64-bit encryption standard.

In an alternate embodiment, the first device 102 may communicate with all devices of the individuals present in proximity of the first device 102, to collect their identity information. In one case, the first device 102 may receive the identity information comprising a user's personal details only. The user's personal details may include a name, address, phone number, websites, e-mail identity, and social media links of owners of the devices. Successively, the first device 102 may store the received identity information in metadata of the captured image.

The identity information stored in metadata may be used for several purposes. In one case, the identity information may be used for identifying individuals present around the first device 102, while the image was captured. For example, the first device 102 may capture an image on Jan. 15, 2017 and may receive identity information from all devices used by the individuals present in proximity of the first device 102. The identity information, may thus be stored in metadata of the image, and may help in identifying the individuals not present in the image but were present in proximity of the first device 102, Such information may be useful for investigation and law enforcement agencies, in one case. The identity information may also find other uses as perceived by a person skilled in the art.

In one embodiment, the first device 102 may control the amount of identity information received from the neighboring devices. In one case, the neighboring devices may send connection requests to the first device 102, while the first device 102 enters into an image capturing mode. A user operating the first device 102 may select to approve a few connection requests amongst all the connection requests, received from the neighboring devices. Further, the first device 102 may also comprise stored user preferences for accepting or rejecting the connection requests received from the neighboring devices.

Figure 2:
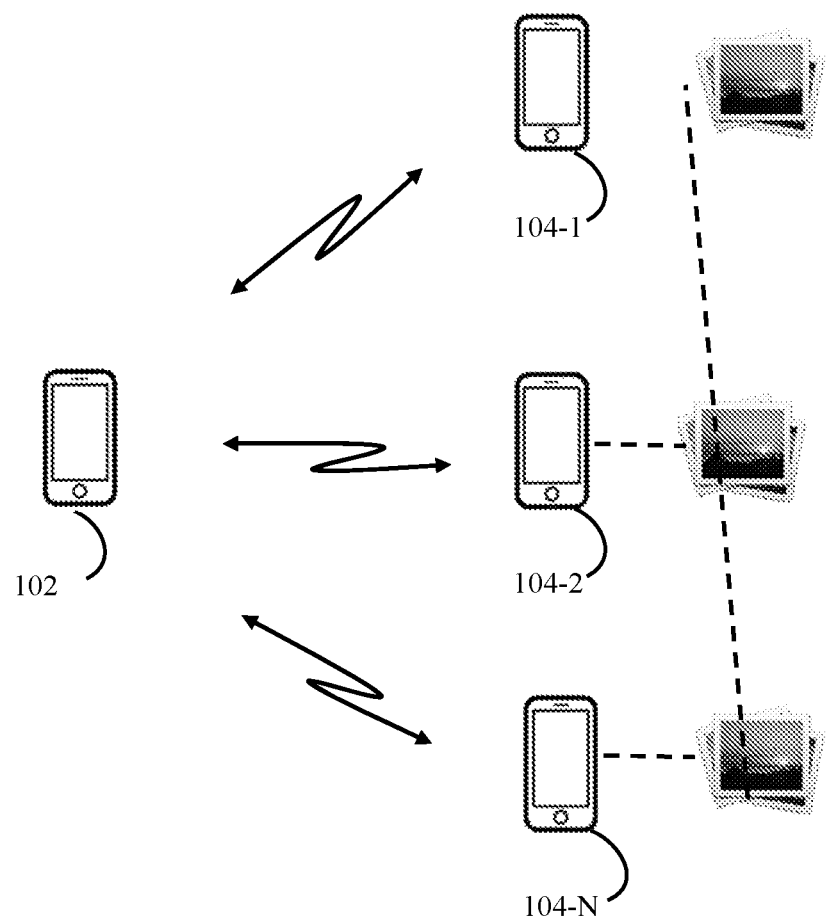
FIG. 2 illustrates a connection diagram between the first device 102 and the neighboring devices (104-1 to 104-N) where the neighboring devices transmit identity information along with images, to the first device 102.

In one embodiment, the first device 102 may receive the identity information along with images present in the neighboring devices (104-1 to 104-N), as illustrated using FIG. 2. The first device 102 may receive such information either before or after capturing an image. Each neighboring device communicating with the first device 102 may at least transmit identity information of the owners of the devices. Further, the neighboring devices may also transmit identity information of the friends and family personnel of the owner of the devices.

Post receiving the identity information, the first device 102 may attempt to identify identities of individuals present in the captured image. In one case, the first device 102 may identify the identities by comparing the captured image with the images of the individuals received from the second device 104-1. The captured image may be compared with the images of the individuals received from the second device 104-1, using an image comparison technique. The image comparison technique may be selected from a group consisting of pixel to pixel comparison, keypoint matching, histogram method, Scale Invariant Feature Transform (SIFT), Speed Up Robust Feature (SURF), Binary Robust Independent Elementary Features (BRIEF), and Oriented FAST and Rotated BRIEF (ORB).

In one embodiment, the first device 102 may retrieve images of the individuals from their social media profiles. The first device 102 may retrieve such images based on received identity information of the individuals. The first device 102 may retrieve the image from the social media profiles in cases where a received image of the individuals is not present in a good quality, a recent image of the individual is required, or when no image of the individual is received. Successively, the first device 102 may use the images retrieved from the social media profiles for image comparison to find identity of the individuals present in the captured image.

Based on a successful image match found using the image comparison technique, the first device 102 may identify the identities of the individuals present in the captured image. Successively, the first device 102 may tag the individuals using the identities and personal details corresponding to the individuals. Successively, the first device 102 may store the tagging information in metadata of the captured image. Further, the first device 102 may store the tagging information on a remote server 108 in case of low memory availability with the first device 102.

Although, above explanation is provided considering a single neighbouring device i.e. the second device 104-1, but multiple neighbouring devices (104-1 to 104-N) may be scanned and may be communicated in parallel to receive the identity information present with them.

In one exemplary embodiment, the first device 102 may capture an image comprising five individuals. Successively, the first device 102 may communicate with the devices of the five individuals present in the image and may receive their identity information. Further, the first device 102 may also communicate with other nearby devices to collect the identity information of individuals. In one case, the first device 102 may obtain identity information of ten individuals. The first device 102 may use the identity information of the ten individuals for identifying the five individuals present in the image captured by the first device 102.

Based on the comparison of the captured image and the received identity information, the first device 102 may successfully identify two individuals out of the five individuals present in the captured image. The first device 102 may tag the two identified individuals with their identity information. Such tagging information may be stored in metadata of the image, present in the memory 112 of the first device 102.

Thus, it becomes evident from the above explained steps that only a small amount of the memory 112 may be occupied for storing the identity information of ten individuals. Further, a minimal processing power may get consumed for comparing the identity information of ten individuals with the identity information of five individuals.

Figure 3:
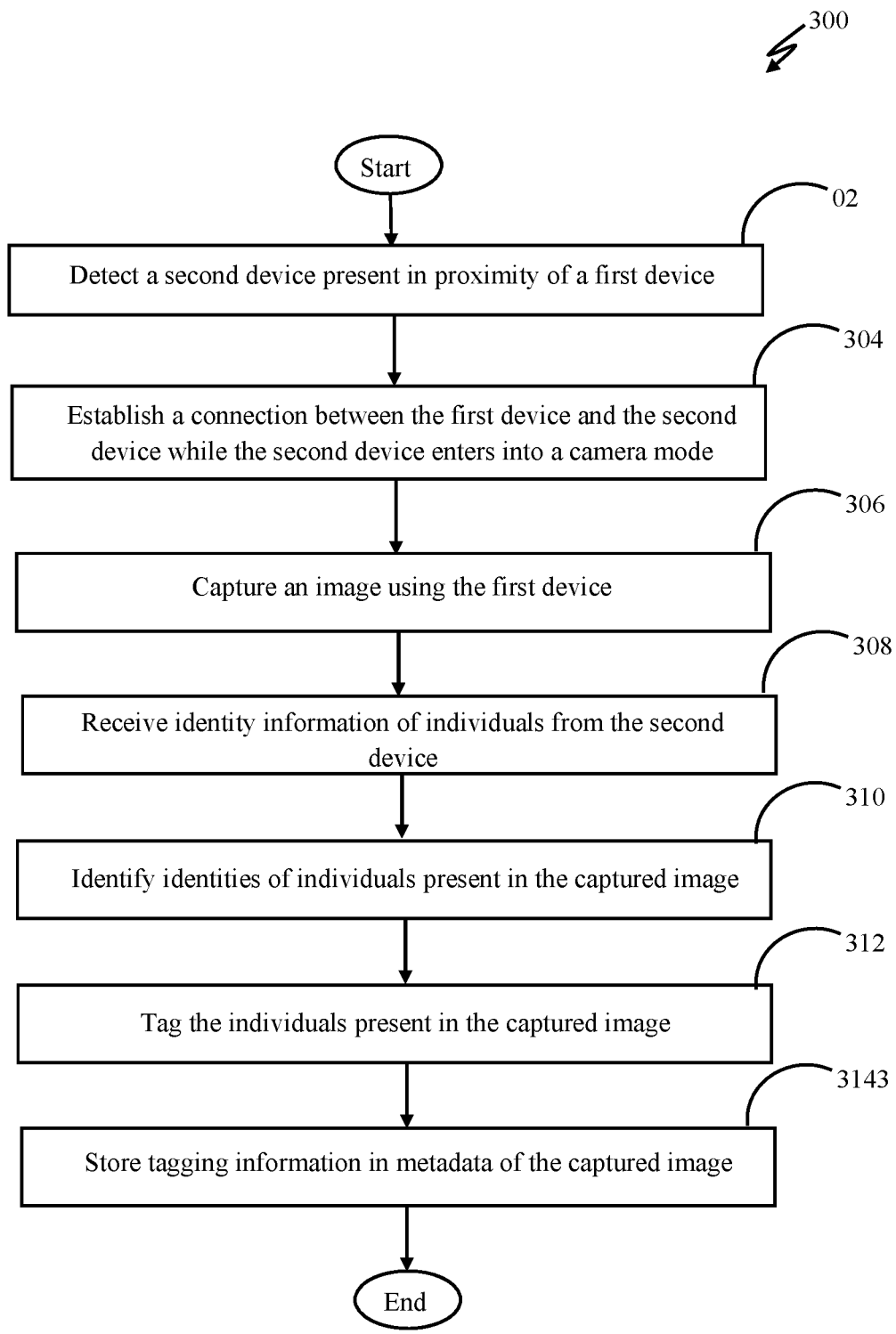
FIG. 3 illustrates a flowchart 2300 of a method for identifying and tagging individuals present in an image, according to an embodiment.

FIG. 3 illustrates a flowchart 300 of a method of identifying and tagging individuals present in an image, according to an embodiment. FIG. 3 comprises a flowchart 300 that is explained in conjunction with the elements disclosed in FIG. 1.

The flowchart 300 of FIG. 3 shows the architecture, functionality, and operation for identifying and tagging individuals present in an image. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 3 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 300 starts at the step 302 and proceeds to step 314.

At step 302, a second device 104 present in proximity of a first device 102 may be detected.

In one embodiment, the second device 104 may be detected by the first device 102.

At step 304, a connection may be established between the first device 102 and the second device 104. The connection may be established while the second device 104 enters into a camera mode. In one embodiment, the connection may be established by a processor 110 of the first device 102.

At step 306, an image may be captured using the first device 102. In one embodiment, the image may be captured by an image capturing unit 116 of the first device 102.

At step 308, identity information of individuals may be received by the first device 102, from the second device 104. In one embodiment, the identity information may be received by the processor 110 of the first device 102.

At step 310, identities of individuals present in the captured image may be identified. In one embodiment, the identities may be identified by the processor 110 of the first device 102.

At step 312, the individuals present in the captured image may be tagged. In one embodiment, the captured images may be tagged by the processor 110 of the first device 102.

At step 314, tagging information may be stored in metadata of the captured image. In one embodiment, the tagging information may be stored in the memory 112 of the first device 102.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e. g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method for identifying and tagging individuals present in an image, the method comprising:
   detecting, by a first device, a second device present in proximity;
   establishing a connection between the first device and the second device based on a connection request received by the first device from the second device, wherein the connection request is sent by the second device when the first device enters into a camera mode for capturing images;
   capturing an image using an imaging capturing unit of the first device;
   receiving by the first device, from the second device, identity information of individuals, wherein the identity information comprises at least one of images and personal details of the individuals;

identifying, by the first device, identities of individuals present in the captured image by comparing the captured image with the images of the individuals received from the second device;

tagging, by the first device, individuals present in the captured image using the identities and corresponding personal details; and storing, by the first device, tagging information in metadata or other information related to the captured image.

2. The method of claim 1, wherein the connection request is sent using at least one of a wired and wireless communication techniques.

3. The method of claim 2, wherein the wireless communication technique used for sending the communication request is selected from a group consisting of Wireless Fidelity (Wi-Fi), Bluetooth, Near Field Communication (NFC), Infrared (IR), and Radio Frequency Identification (RFID).

4. The method of claim 1, wherein the identity information is presented in an encrypted format.

5. The method of claim 1, wherein the personal details of the individuals comprise a name, address, phone number, websites, e-mail, identity and social media links of the owner of the first device.

6. The method of claim 1, wherein the captured image is compared with the images of the individuals using a technique selected from a group consisting of pixel to pixel comparison, keypoint matching, histogram method, Scale Invariant Feature Transform (SIFT), Speed Up Robust Feature (SURF), Binary Robust Independent Elementary Features (BRIEF), and Orient FAST and Rotated BRIEF (ORB).

7. The method of claim 1, further comprising receiving the identity information of individuals, from plurality of device of the individuals in the captured image.

8. The method of claim 7, wherein the plurality of devices belong to the individuals present in the captured image.

9. The method of claim 1, further comprising storing the tagging information present in the metadata of the captured image on a remote server.

10. A system for identifying and tagging individuals in an image, the system comprising:
a first device and a second device, the first device comprising:
a processor;
an image capturing unit; and
a memory couples to the processor, wherein the processor executes an algorithm stored in the memory to:
detect the second device present in proximity of the first device;
establish a connection between the first device and the second device based on a connection request received by the first device when it enters into a camera mode for capturing images;
capture an image using the image capturing unit of the first device;
receive identity information of individuals from the second device, wherein the identity information comprises at least one of images and personal details of the individuals;

identify identities of individuals present in the captured image by comparing the captured image with the images of the individuals received from the second device;

tag individuals present in the captured image by comparing the captured image with the images of the individuals received from the second device;

store tagging information in metadata or other information related to the captured image.

11. The system of claim 10, wherein the connection request is sent using at least one of a wired and wireless communication technique.

12. The system of claim 11, wherein the wireless communication technique used for sending the communication request is selected from a group consisting of Wireless Fidelity (Wi-Fi), Bluetooth, Near Field Communication (NFC), Infrared (IR), and Radio Frequency Identification (RFID).

13. The system of claim 10, wherein the identity information is present in an encrypted format.

14. The system of claim 10 wherein the personal details of the individuals comprise a name, address, phone number, websites, e-mail identity and social media links of the owner of the first device.

15. The system of claim 10, wherein the captured image is compared with the images of the individuals using a technique selected from a group consisting of pixel-to-pixel comparison, keypoint matching, histogram method, Scale Invariant Feature Transform (SIFT), Speed Up Robust Feature 41(SURF), Binary Robust Independent Elementary Features (BRIEF), and Orient FAST and Rotated BRIEF (ORB).

16. The system of claim 10, further comprising receiving the identity information of individuals, from a plurality of devices.

17. The system of claim 16, wherein the plurality of devices belongs to the individuals present in the captured image.

18. The system of claim 10, further comprising storing the tagging information present in metadata of the captured image on a remote server.

19. A method of storing identity information of individuals in an image, the method comprising:
detecting, by a first device a second device present in proximity;
establishing a connection between the first device and the second device based on a connection request received by the first device from the second device;
capturing an image using an image capturing unit of the first device;
receiving by the first device, from the second device, identity information of individuals, wherein the identity information comprises personal details of the individuals;
storing, by the first device, the identity information in metadata or other information in metadata or other information related to the captured image.

20. The method of claim 19, wherein the connection request is received while the first device enters into a camera mode for capturing images.

* * * * *